(12) United States Patent
Peters et al.

(10) Patent No.: US 7,964,059 B2
(45) Date of Patent: Jun. 21, 2011

(54) LARGE VOLUME REACTOR OR THIN FILM EVAPORATOR WITH A PREMIXING UNIT

(75) Inventors: Hans Peters, Weil (DE); Rainer Naef, Dietikon (CH)

(73) Assignee: Buss-SMS-Canzler GmbH, Butzbach (DE)

( * ) Notice: Subject to any disclaimer, the term of this patent is extended or adjusted under 35 U.S.C. 154(b) by 983 days.

(21) Appl. No.: 11/543,585

(22) Filed: Oct. 5, 2006

(65) Prior Publication Data

US 2007/0125499 A1 Jun. 7, 2007

(30) Foreign Application Priority Data

Dec. 5, 2005 (EP) .................................. 05026443

(51) Int. Cl.
 *B01D 1/22* (2006.01)
 *B01J 19/18* (2006.01)
 *B01F 7/00* (2006.01)
 *B01F 13/10* (2006.01)

(52) U.S. Cl. ...... 159/13.1; 159/49; 366/155.2; 366/305; 366/341; 422/224; 422/225; 422/236

(58) Field of Classification Search .................. 159/13.1, 159/25.1, 49; 366/155.2, 305, 341; 422/224, 422/225, 236

See application file for complete search history.

(56) References Cited

U.S. PATENT DOCUMENTS

| | | | |
|---|---|---|---|
| 5,534,113 A * | 7/1996 | Quigley et al. .................. | 159/49 |
| 5,669,710 A * | 9/1997 | Schebesta et al. ............... | 366/97 |
| 5,888,288 A * | 3/1999 | Quigley et al. ............ | 106/200.3 |
| 5,931,579 A | 8/1999 | Gallus et al. | |
| 6,280,076 B1 | 8/2001 | Müntener | |
| 6,402,362 B1 | 6/2002 | Gmeiner | |
| 7,083,319 B2 * | 8/2006 | Peters et al. ..................... | 366/75 |
| 2007/0219340 A1 * | 9/2007 | Lichtenberger et al. ...... | 528/272 |

FOREIGN PATENT DOCUMENTS

| | | |
|---|---|---|
| CH | 288 154 A | 1/1953 |
| DE | 1 275 510 | 8/1968 |
| DE | 226 778 A1 | 9/1985 |
| DE | 260 467 | 9/1988 |
| DE | 40 00 311 A1 | 7/1990 |
| DE | 297 09 060 | 7/1997 |
| DE | 196 38 567 A1 | 3/1998 |
| EP | 0 194 812 A2 | 9/1986 |

(Continued)

OTHER PUBLICATIONS

International Search Report/International Preliminary Report on Patentability/Written Opinion of The International Searching Authority for corresponding International Application No. PCT/EP2006/011320.

*Primary Examiner* — Virginia Manoharan

(74) *Attorney, Agent, or Firm* — Alston & Bird LLP

(57) ABSTRACT

The large volume reactor or a thin film evaporator including a housing enclosing a reactor chamber . A reactor rotor driven about an axis of rotation is located in the reactor chamber. The housing comprises a reactor chamber inlet opening and a product outlet. A premixing unit is located adjacent the reactor chamber inlet opening, which is configured to mix a starting material fed through one or more product inlet openings to form a prepared substance which is fed directly to the reactor chamber.

8 Claims, 4 Drawing Sheets

FOREIGN PATENT DOCUMENTS

| | | |
|---|---|---|
| EP | 0 274 668 | 7/1988 |
| EP | 0 960 639 A2 | 12/1999 |
| EP | 1 101 525 | 5/2001 |
| EP | 1 417 998 A1 | 5/2004 |
| EP | 1 477 223 A2 | 11/2004 |
| EP | 1 714 694 A1 | 10/2006 |
| FR | 925 563 A | 9/1947 |
| GB | 1 455 663 | 11/1976 |
| GB | 2 116 158 A | 9/1983 |
| JP | 60 070219 A | 4/1985 |
| SU | 1 139 629 | 2/1985 |

* cited by examiner

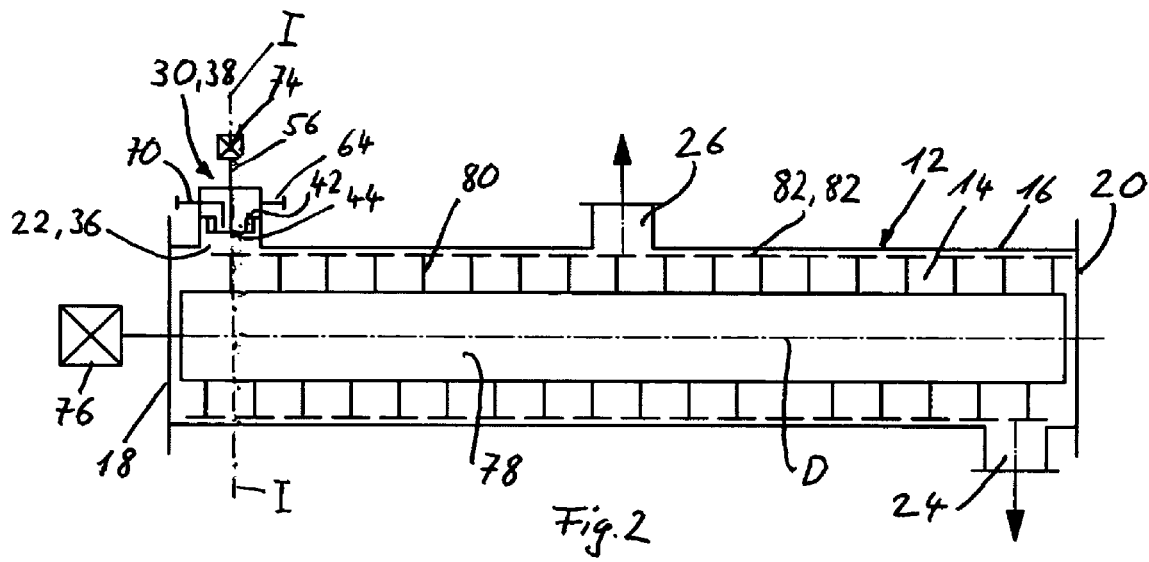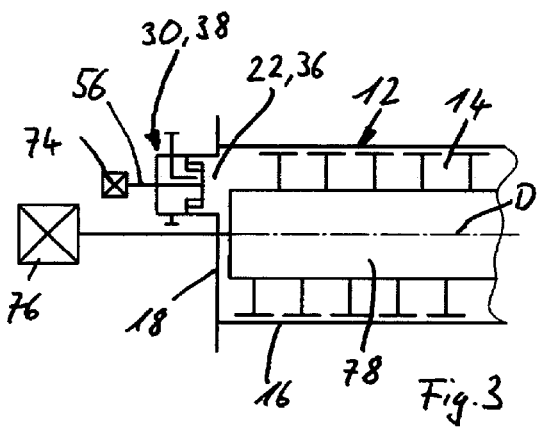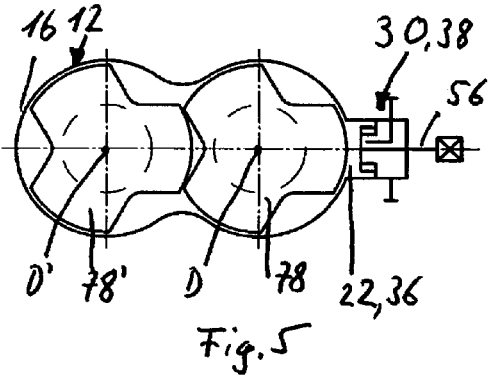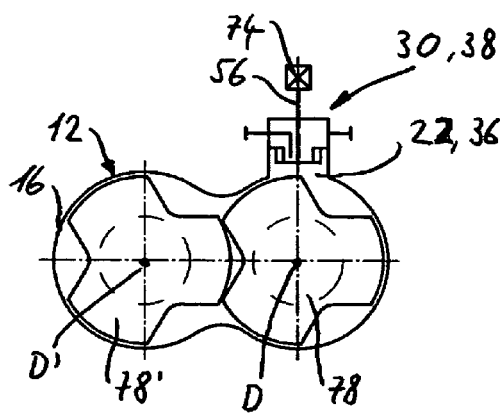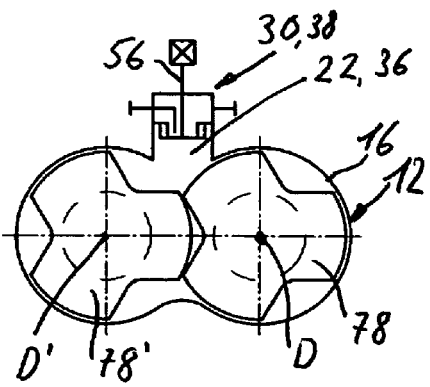

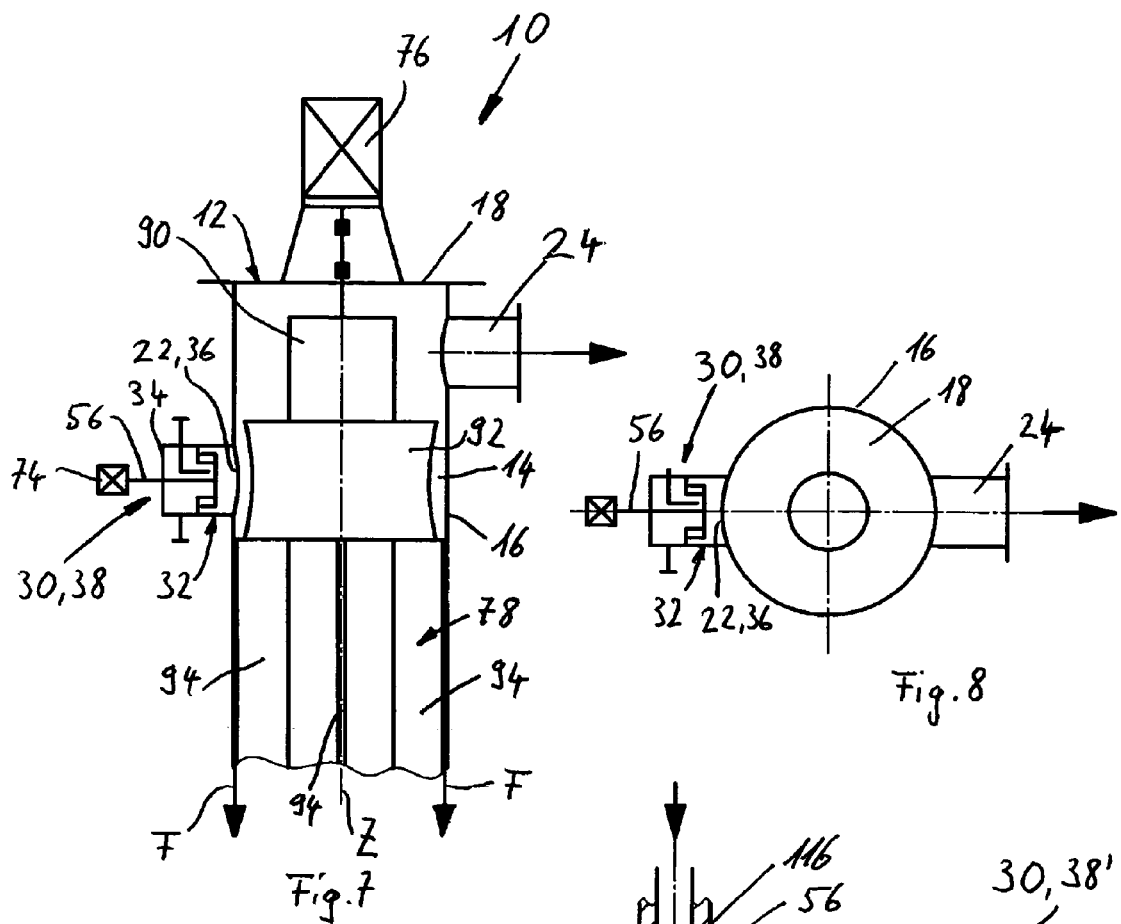
Fig. 7
Fig. 8
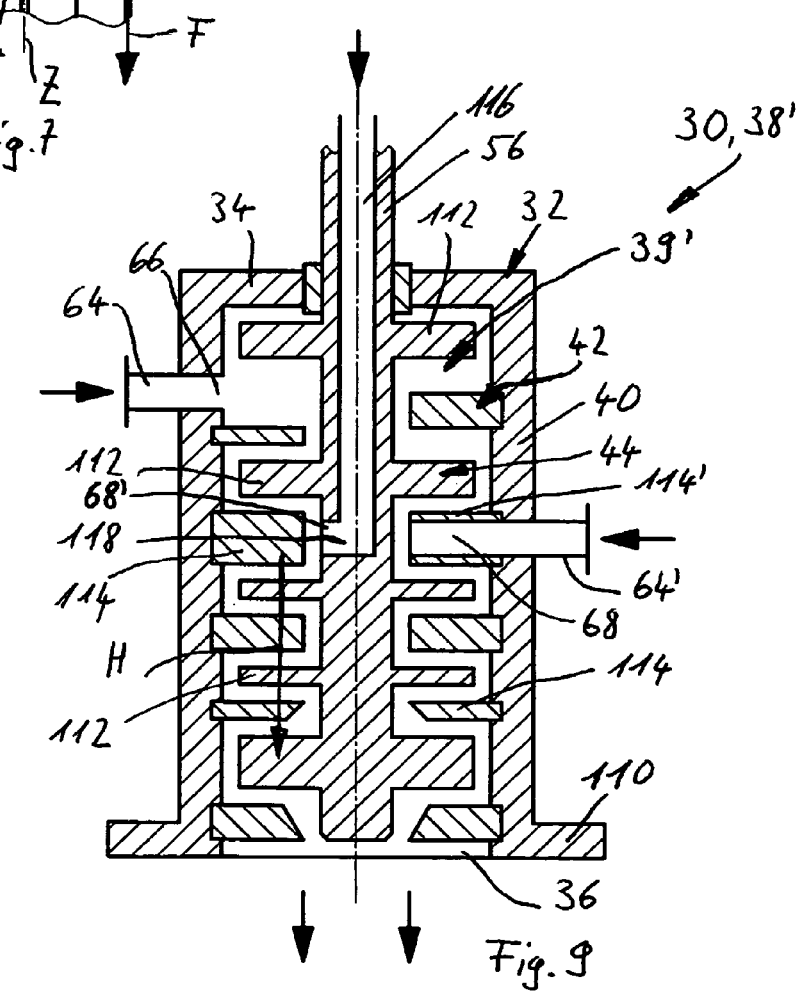
Fig. 9

LARGE VOLUME REACTOR OR THIN FILM EVAPORATOR WITH A PREMIXING UNIT

BACKGROUND OF THE INVENTION

The present invention relates to a large volume reactor or a thin film evaporator, and a method for processing a starting material in a large volume reactor or a thin film evaporator.

Large volume reactors or thin film evaporators are generally known and are used, among other things, in the production and/or processing of plastics.

Large volume reactors can be embodied, on the one hand, as kneaders or mixers such as is disclosed, for example, in the European Patent Application EP-A-1 477 223 or in the prior European Patent Application with the Application Number EP 05008591 which is published as European Publication No. EP 1 714 694 A1. These two documents disclose large volume reactors each having a plurality of reactor rotors. A large volume reactor with only one rotor is also known from the European Patent Application EP-A-1 417 998.

Thin film systems are known, for example, from EP-A-0 960 639 and DD-A-226 778.

In the known large volume reactors or thin film evaporators, a starting material or a plurality of starting materials is or are supplied via one or a plurality of product inlet openings to a reactor chamber of the large volume reactor or the thin film evaporator in which the starting material or the starting materials are processed by means of a reactor rotor. The starting materials can in this case be present as pure liquids, as at least partially gaseous components, as suspensions, as emulsions, as solutions, as pastes, as viscous melts, as granular solids, as fine solids, as foams or as a combination thereof.

The known large volume reactors or thin film evaporators have various disadvantages since the individual starting materials can either be supplied separately from one another or through the same reactor chamber inlet opening to the reactor chamber.

If a plurality of low viscosity starting materials are supplied to the reactor chamber of a kneader or a mixer, these low viscosity starting materials mix poorly since the reactor rotor turns relatively slowly, with the result that the two low viscosity starting materials can form two phases inside the reactor chamber which do not mix well with one another.

Furthermore, extremely small quantities of a second starting material, for example a catalyst, can be mixed only poorly into a much larger quantity of a first starting material by means of the known large volume reactors. If the second starting material is already mixed with the first starting material outside the reactor chamber, a reaction can begin outside the reactor chamber. This can result in a blockage in an intake to the reactor chamber. However, if the second starting material is supplied directly in the reactor chamber, the problem arises that the small quantity of the second starting material could only be mixed very poorly and slowly with the first starting material in the reactor chamber. This can result in an inhomogeneous product and/or large agglomerates in the reactor chamber since the first starting material can react strongly in parts or almost not at all with the second starting material. Large agglomerates result in a product having non-uniform properties. Furthermore, large agglomerates can result in thermal damage to the product since the heat produced during the reaction can only be removed very poorly. In addition, large agglomerates can result in impermissibly high mechanical loading of the reactor or the thin film evaporator.

If different starting materials which cannot be thoroughly mixed together are supplied to a mixer or a kneader, segregation effects can also occur in the reactor chamber.

Furthermore, the product quality is also negatively influenced if starting substances which react strongly with one another are fed into the reactor chamber via a plurality of reactor chamber inlet openings, since local concentration differences inside the reactor chamber can result in a nonuniform product quality.

Furthermore, as a result of exothermic reactions which take place when various starting materials are combined outside the large volume reactor, problems with the removal of the heat thereby produced can arise.

The known large volume reactors with a comparatively slowly rotating reactor rotor also exhibit problems if one of the starting materials is present in a gas phase and the other starting material is present in a liquid or a melt-like phase and the starting material present in the gas phase is to be dispersed in the starting material present in the liquid or melt-like phase.

With the known large volume reactors it is also difficult to incorporate fine granular material systems uniformly into a fluid phase.

It is accordingly an object of the present invention to provide a large volume reactor or a thin film evaporator which is free from the disadvantages of the prior art as discussed above.

SUMMARY OF THE INVENTION

The above and other objects and advantages of the invention are achieved by the provision of a large volume reactor or a thin film evaporator which comprises a premixing unit whose unit outlet opening is located adjacent and in communication with a reactor chamber inlet opening. It is thereby achieved that the premixing unit can be arranged free from connecting pipes on the housing, thereby avoiding connecting pipes and bottlenecks associated therewith. It is furthermore possible that a starting material supplied to the premixing unit can be prepared, for example premixed, in the premixing unit and then delivered immediately into the reactor chamber of the large volume reactor where the prepared material is further processed. It is also feasible that a substance which is also supplied to the reactor chamber is precipitated in the premixing unit.

It can thus be achieved that when starting materials which initially react rapidly and/or violently are combined, these can be premixed and/or prepared by means of the premixing unit immediately before the reactor chamber of the large volume reactor or thin film evaporator. The substance prepared by the premixing unit is supplied directly to the reactor chamber where this is further processed to form a product. By using the premixing unit, the efficiency of the large volume reactor or thin film evaporator can be enhanced compared with the prior art, or the processing of certain starting materials by means of a large volume reactor or thin film evaporator can be rendered possible for the first time since the violent and/or rapid reactions which may occur when combining the starting materials take place in the premixing unit directly before the reactor chamber and a subsequent slow reaction then takes place in the reactor chamber under the action of the reactor rotor on the prepared substance.

Starting materials can be supplied to the premixing unit as pure liquids, as at least partially gaseous components, as suspensions, as emulsions, as solutions, as pastes, as viscous melts, as granular solids, as fine solids, as foams or as a combination thereof.

According to a preferred embodiment, the housing has an inlet connection in which the premixing unit is placed or inserted. It is thereby possible to locate the premixing unit very simply close to the reactor chamber or immediately outside the reactor chamber.

According to another preferred embodiment, the premixing unit comprises a driven rotor which cooperates with a stator. The mixing of the starting material or the starting materials is thereby implemented actively in the premixing unit. By means of the rotor and the stator cooperating therewith, the starting material is mixed thoroughly to form a prepared substance which is supplied immediately to the reactor chamber through the unit outlet opening. The form of the prepared substance supplied to the reactor chamber can be further suitably influenced for this, for example, by producing a granular prepared substance from two liquid starting materials or by producing a gel-like prepared substance which is particularly suitable for further processing in the reactor chamber.

According to another preferred embodiment, the premixing unit is configured as an axial premixing unit, wherein the stator comprises on the one side a product inlet opening and on the other side, the unit outlet opening facing the reactor chamber. A further product inlet opening is located between the product inlet opening and the unit outlet opening. It is thereby possible to prepare a starting material supplied through the product inlet opening before supplying a further starting material through the further product inlet opening, for example by heating, cooling or preagitating.

According to another preferred embodiment, it is possible to use a radial premixing unit for mixing the starting material. Since its rotor can have a high speed, this embodiment is particularly well suited for mixing two different phases, for example a gaseous phase with a liquid or melt-like phase.

According to another preferred embodiment, the stator engages in the cup-shaped rotor and a radial mixer formed from the rotor and the stator is located between an antechamber in which the product inlet opening discharges and the reactor chamber. As a result of the stator engaging in the rotor, the antechamber is separated from the reactor chamber by the radial mixer and a starting material supplied to the antechamber through the product inlet opening is prepared by the radial mixer.

According to another preferred embodiment, a material inlet pipe passes through the antechamber whose further product inlet opening ends radially inside the rotor casing and the stator part. By means of this material inlet pipe, a further starting material can be combined with the starting material through the further product inlet opening in the main conveying direction immediately before the radial mixer, this being immediately mixed vigorously with the starting material by the radial mixer. In particular as a result of this embodiment, extremely small amounts of the further starting material, for example a catalyst, can be mixed with the starting material, for example a monomer.

According to another preferred embodiment, a further starting material can be supplied directly to a region of the premixing unit in which the starting material is vigorously mixed with the further starting material.

Further preferred embodiments of the large volume reactor according to the invention, the thin film evaporator or the method for processing a starting material in a large volume reactor or a thin film evaporator are obtained from the detailed description and the drawings.

BRIEF DESCRIPTION OF THE DRAWINGS

The invention is explained in detail hereinafter with reference to exemplary embodiments shown in the schematic drawings, in which:

FIG. 2 is the large volume reactor according to the invention as shown in FIG. 1, in longitudinal section through the premixing unit, wherein an outlet open at the top for vapors and a downward-leading product outlet from the reactor chamber are shown on the cylinder casing;

FIG. 3 is a second exemplary embodiment of a large volume reactor according to the invention, in longitudinal section through the premixing unit, whose cylindrical housing comprises the reactor chamber inlet opening at a lateral front end wall of the housing and the unit outlet opening of the premixing unit is arranged congruent to the reactor chamber inlet opening;

FIG. 4 is a double shaft large volume reactor according to a third exemplary embodiment according to the invention, in cross section through the premixing unit, comprising two reactor rotors aligned parallel to one another and disposed horizontally inside the reactor chamber defined by an outer cylinder surface, said outer cylinder surface comprising a reactor chamber inlet opening disposed above one of the two reactor rotors and the unit outlet opening being arranged congruent to the reactor chamber inlet opening;

FIG. 5 is a double-shaft large volume reactor according to a fourth exemplary embodiment according to the invention, in cross section through the premixing unit, comprising the reactor chamber inlet opening in a lateral region of the outer cylinder surface compared to the third exemplary embodiment and the unit outlet opening being arranged congruent to the reactor chamber inlet opening;

FIG. 6 is a double shaft large volume reactor according to a fifth exemplary embodiment according to the invention, in cross section through the premixing unit, the reactor chamber inlet opening being located in an upper region of the outer cylinder surface and centrally with respect to the two reactor rotors and the unit outlet opening being arranged congruent to the reactor chamber inlet opening;

FIG. 7 is a thin film evaporator according to the invention, in longitudinal section through the premixing unit, comprising a reactor rotor driven about a vertical axis of rotation and arranged in a circular-cylindrical housing, said housing having a reactor chamber inlet opening at the end against which a premixing unit abuts with its unit outlet opening;

FIG. 8 is a sectional plan view of the thin layer evaporator according to FIG. 7, taken through the premixing unit;

FIG. 9 is a longitudinal section through a premixing unit embodied as an axial mixing unit which can be used as an alternative to the premixing unit shown in FIGS. 1 to 8;

DETAILED DESCRIPTION OF THE PREFERRED EMBODIMENTS

Figure 1:
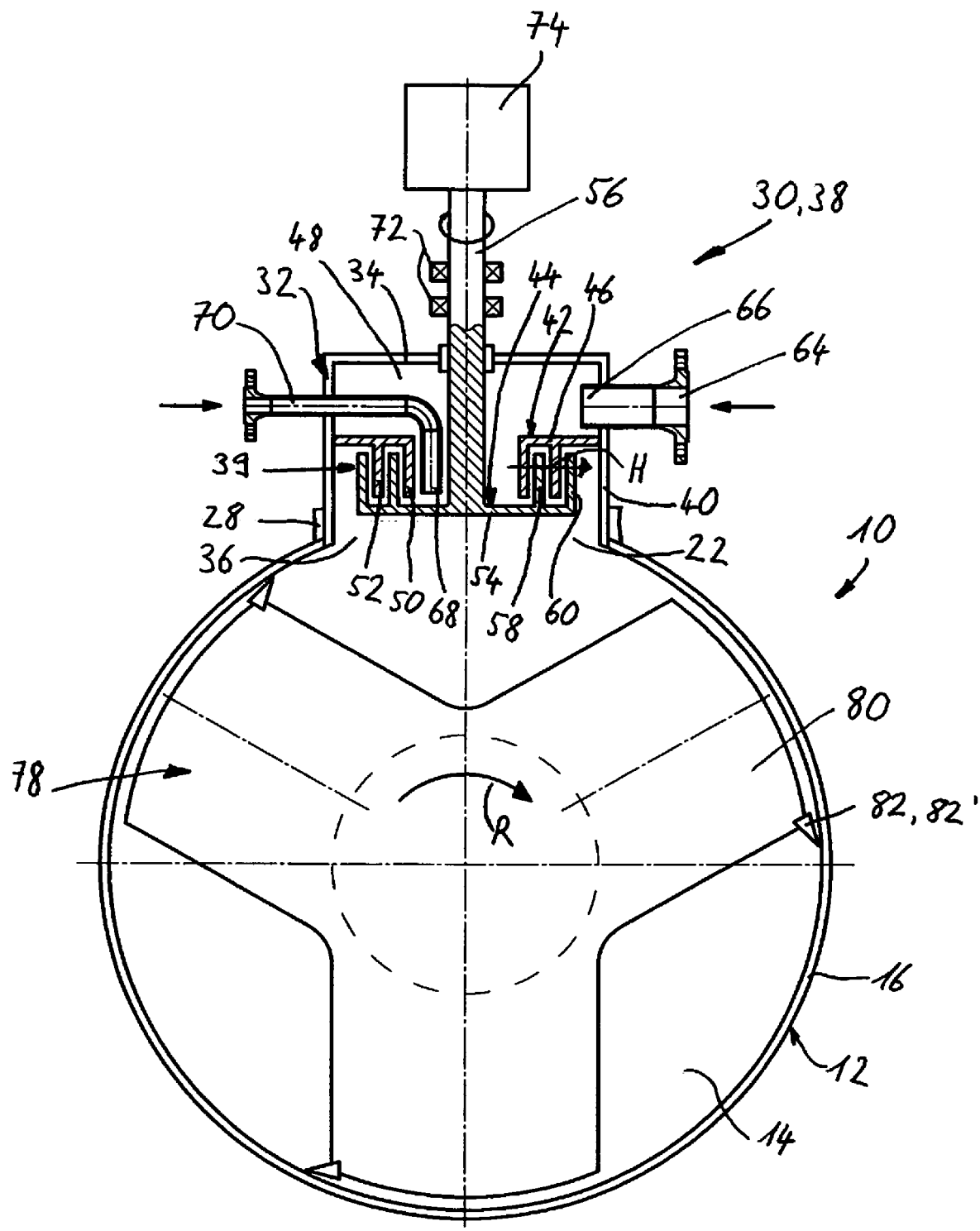
FIG. 1 is a single shaft large volume reactor according to the invention, shown in cross section through a premixing unit along the line I-I shown in FIG. 2, comprising a cylinder casing of a housing defining a reactor chamber, a reactor rotor located horizontally in the reactor chamber and a premixing unit embodied as a radial premixing unit, whose unit outlet opening is located at a radial reactor chamber inlet opening.

FIGS. 1 and 2 show a large volume reactor 10 according to the invention, according to a first exemplary embodiment. This large volume reactor 10 is embodied as a mixer or as a kneader.

A housing 12 of the large volume reactor 10 which defines a reactor chamber 14 is formed by a circular-cylindrical horizontally aligned casing 16 which is closed on both ends by a front end wall 18, and a rear end wall 20. Close to front end wall 18, the casing 16 includes a reactor chamber inlet opening 22 arranged on the upper side of the casing 16. Close to the rear end wall 20, the casing 16 has a product outlet 24 on its underside. An outlet 26 for vapors is further provided, this being located on the upper side of the casing 16 and approximately centrally between the two end walls 18, 20.

As shown in FIG. 1, the casing 16 has an inlet connection 28 at the reactor chamber inlet opening 22 in which a premixing unit 30 is inserted.

Alternatively, the inlet connection 28 can also be provided with a flange, in which case the premixing unit 30 is placed on the flange.

The premixing unit 30, embodied as a radial premixing unit 38, comprises a circular cylindrical unit housing 32 which is closed on one side, facing away from the reactor chamber 14, by a unit housing front wall 34. Opposite to the unit housing front wall 34 and facing toward the reactor chamber 14, the premixing unit 30 has a unit outlet opening 36.

Located inside the unit housing 32 is a radial mixer 39 which is formed by a stator 42 fixedly connected to a unit casing 40 of the unit housing 32 and by a rotor 44. A gap is formed between the unit casing 40 and the rotor 44 through which a substance prepared by the radial mixer 39 is fed to the reactor chamber 14, whereby after passing through the gap, the prepared substance need not pass through any further constriction before reaching the reactor chamber 14.

The unit outlet opening 36 is formed by the inside cross section of the unit casing 40, and it directly adjoins the gap on the one side and directly adjoins the reactor chamber on the other side. The opening 36 is located essentially congruent to the reactor chamber inlet opening 22.

Figure 13:
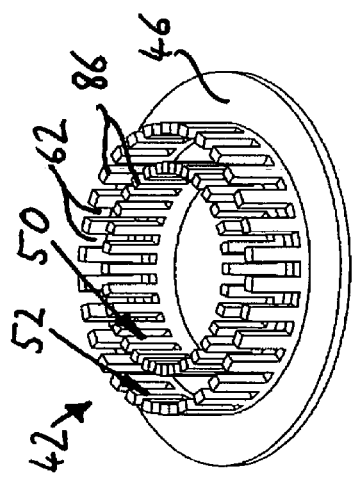
FIG. 13 is a perspective view of the stator shown in FIG. 1, showing in particular radial openings through a radially inner stator part and through a further stator part, which is located concentrically to and radially outside the inner stator part.

The stator 42 shown in FIGS. 1, 2 and 13 has an annular disk-shaped stator flange 46 which projects radially inward from the unit casing 40, and which divides the interior of the unit housing 32 into a region facing the reactor chamber 14 and an antechamber 48 facing away from the reactor chamber 14. The stator 42 further has a circular cylindrical or annular stator part 50 disposed on the radially inner edge region of the stator flange 46 and projecting in the direction of the reactor chamber 14 from the stator flange 46. The stator part 50 lies concentric to the unit casing 40. An annular further stator part 52 whose diameter is greater than the diameter of the stator part 50 is located concentrically to the stator part 50 on the stator flange 46.

Figure 12:
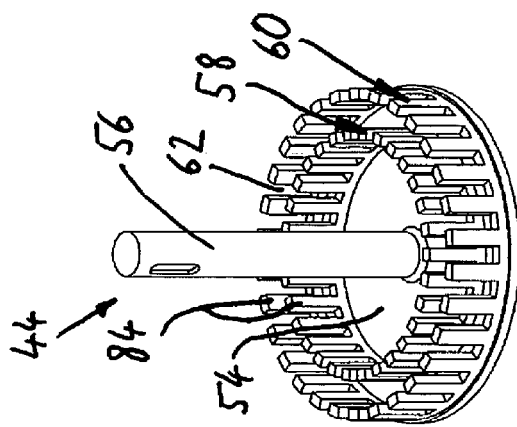
FIG. 12 is a perspective view of the rotor shown in FIG. 1, showing in particular radial openings through a radially inner rotor casing and through a further rotor casing, which is located concentrically to and radially outside the inner rotor casing.

The rotor 44 shown in FIGS. 1, 2 and 12 is embodied as cup-shaped, with the opening of the cup-shaped rotor 44 facing away from the unit outlet opening 36. The rotor 44 has a rotor base 54 which is rigidly connected to a shaft 56 arranged concentrically with respect to the stator part 50 on a side facing away from the unit outlet opening 36. The shaft 56 ends in the direction of the reactor chamber 14 at the rotor base 54.

An annular rotor casing 58 arranged concentrically to the shaft 56 is fixedly connected to the rotor base 54 and is positioned in an intermediate space between the stator part 50 and the further stator part 52. An annular further rotor casing 60 likewise arranged concentrically to the shaft 56 is arranged on the rotor base 54 such that the further stator part 52 is positioned in an intermediate space between the rotor casing 58 and the further rotor casing 60.

The length of the rotor casing 58, the further rotor casing 60, the stator part 50 and the further stator part 52 in the direction of the shaft 56 is selected to be substantially the same. In the direction of the shaft 56, the free end of the rotor casing 58 almost contacts the stator flange 46, forming a narrow gap between the free end of the rotor casing 58 and the stator flange 46. Consequently, the free end of the stator part 50 likewise almost contacts the rotor base 54, likewise forming a narrow gap between the free end of the stator part 50 and the rotor base 54. In the radial direction the stator part 50 almost contacts the rotor casing 58 which in turn almost contacts the further stator part 52 which for its part almost abuts against the further rotor casing 60. Consequently, respectively one circular-cylindrical gap is formed between the stator part 50 and the rotor casing 58, between the rotor casing 58 and the further stator part 52 and between the further stator part 52 and the further rotor casing 60.

The rotor casing 58, the further rotor casing 60, the stator part 50 and the further stator part 52 have radial openings 62 which are explained in detail in connection with FIGS. 12 and 13.

The rotor 44 of the premixing unit 30 preferably rotates at very high speed, 10 000 to 20 000 revolutions per minute, compared with the reactor rotor 78. This number of revolutions per minute corresponds to a peripheral speed of the rotor 44 of about 20 meters per second to about 60 meters per second.

A product inlet connection 64 having a product inlet opening 66 facing the antechamber 48, opens laterally into the antechamber 48 of the unit housing 32, in radial alignment with respect to the shaft 56. A further product inlet opening 68 is formed at an end region of a material inlet pipe 70 disposed between the shaft 56 and the stator part 50, which pipe passes through the unit housing 32 and through the antechamber 48 and ends near the rotor base 54. An inside diameter of the material inlet pipe 70 is selected to be smaller than an inside diameter of the product inlet connection 64.

The shaft 56 holding the rotor 44 is guided tightly through the unit housing front wall 34. Outside the unit housing 32 the shaft 56 is held in a bearing 72 and is rotatingly driven by means of a rotor drive 74 about the axis of the shaft 56.

FIG. 12 shows the rotor 44 with the shaft 56 arranged thereon and FIG. 13 shows the stator 42 of the premixing unit 30 according to FIG. 1 which fits the rotor 44 as shown in FIG. 12.

As shown in FIG. 12, the rotor casing 58 is formed by a plurality of rotor fingers 84 located on a circular cylinder surface aligned concentrically to the shaft 56 and spaced regularly apart from one another in the circumferential direction of the circular cylinder surface. A gap-shaped radial opening 62 is formed between every two neighboring rotor fingers 84. The further rotor casing 60 is also formed by analogy with the rotor casing 58 by rotor fingers 84. All the rotor fingers 84 have the same length. The number of rotor fingers 84 of the rotor casing 58 is equal to the number of rotor fingers 84 of the further rotor casing 60. In the circumferential direction of the circular cylinder surface the rotor fingers 84 of the rotor casing 58 are offset by half a division with respect to the rotor fingers 84 of the further rotor casing 60.

The stator part 50 of the stator 42 shown in FIG. 13 is formed by a plurality of stator fingers 86 located on a circular cylinder surface concentric to the shaft 56, spaced at regular intervals from one another in the circumferential direction. The further stator part 52 is also formed by analogy with the stator part 50 but the outer cylinder surface on which its stator fingers 86 are located has a larger diameter. The number of stator fingers 86 of the stator part 50 is equal to the number of stator fingers 86 of the further stator part 52. In the circumferential direction of the circular cylinder surface the stator fingers 86 of the stator part 50 are offset by half a division with respect to the stator fingers 86 of the further stator part 52. A gap-shaped radial opening 62 is formed between every two neighboring stator fingers 86.

Located inside the housing 12 defining the reactor chamber 14 is a reactor rotor 78 driven about its axis of rotation D by means of a reactor rotor drive 76 in the direction of rotation R. Located on the reactor rotor 78 is a plurality of three-armed segmental disks 80 which project radially from the reactor rotor 78 (see FIG. 2). A kneading bar 82 or mixing bar 82' (see FIG. 1) is disposed on each arm of the segmental disk 80 on the radially outer, leading end region of the arm in the direction of rotation R, this bar being aligned at least approximately parallel in the direction of the axis of rotation D of the reactor rotor 78.

The relative arrangement of the reactor rotor 78 with regard to the rotor 44 of the premixing unit 30 is such that the segmental disks 80 and the kneading bar 82 or mixing bar 82' run past the rotor 44 without contact.

In a further embodiment of the housing 12, mixing arms (not shown) arranged on the casing 16 of the housing 12 engage in the intermediate space formed between two neighboring segmental disks 80. Preferably respectively three mixing arms are provided per intermediate space, these being located in a plane at right angles to the axis of rotation D and being arranged at regular intervals to one another in the circumferential direction of the casing 16.

Figure 10:
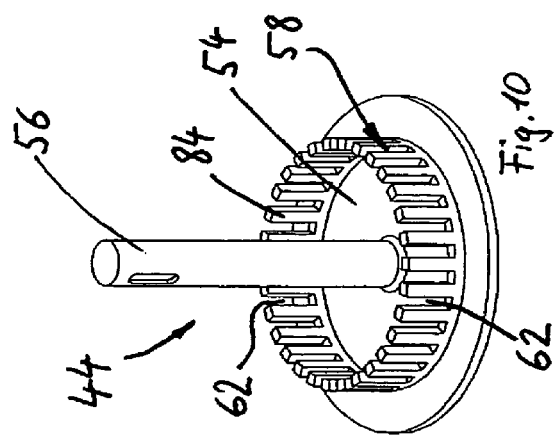
FIG. 10 is a perspective view of a further embodiment of a rotor which can be used instead of the embodiment of the rotor shown in FIG. 1.
Figure 11:
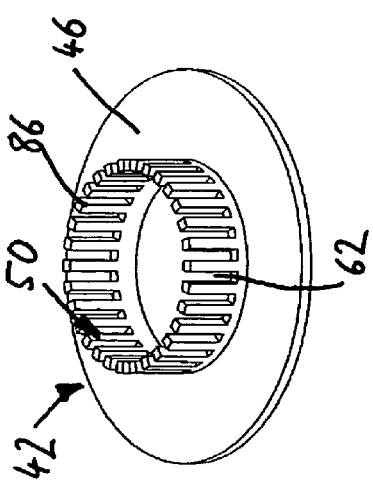
FIG. 11 is a perspective view of a further embodiment of a stator which can be used instead of the embodiment of the stator shown in FIG. 1.

FIGS. 10 and 11 show a first further embodiment of the rotor 44 and the stator 42 where the further rotor casing 60 is omitted on the rotor 44 and the further stator part 52 is omitted on the stator 42 compared to the rotor 44 shown in FIG. 12 or the stator 42 shown in FIG. 13. Consequently, the stator 42 merely has a ring of stator fingers 86 and the rotor 42 merely has a ring of rotor fingers 84.

Figure 14:
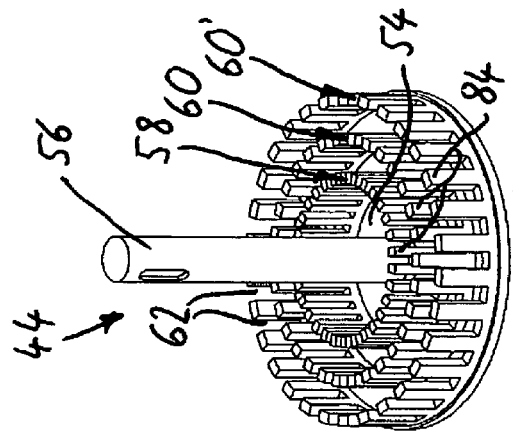
FIG. 14 is a perspective view of a further embodiment of a rotor which can be used instead of the embodiment of the rotor shown in FIGS. 1 and 12.
Figure 15:
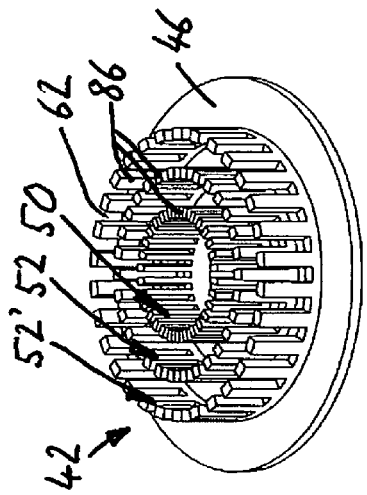
FIG. 15 is a perspective view of a further embodiment of a stator which can be used instead of the embodiment of the stator shown in FIGS. 1 and 13.

FIGS. 14 and 15 show a second further embodiment of the rotor 44 and the stator 42 where the rotor 44 in the same way as the rotor 44 shown in FIG. 12 has the rotor casing 58 and the further rotor casing 60 on the rotor base 54. In addition, the rotor 44 in the second further embodiment comprises a second further rotor casing 60' which is constructed by analogy with the rotor casing 58 and is arranged radially outside the further rotor casing 60 on the rotor base 54 concentrically to the rotor casing 58. The radial distance between the rotor casing 58 and the further rotor casing 60 is selected to be the same as the radial distance between the further rotor casing 60 and the second further rotor casing 60'. The rotor fingers 84 of the second further rotor casing 60' are offset by half a division in the circumferential direction with respect to the rotor fingers 84 of the further rotor casing 60.

In accordance with the rotor 44, the stator 42 in the same way as the stator 42 shown in FIG. 13 has the stator part 50 arranged on the stator flange 46 and the further stator part 52. In addition, the stator 42 of the second further embodiment has a second further stator part 52' which is arranged concentrically to the stator part 50 and is located radially outside the further stator part 52 on the stator flange 46. The radial distance between the stator part 50 and the further stator part 52 is selected to be the same as the radial distance between the further stator part 52 and the second further stator part 52'. The stator fingers 86 of the second further stator part 52' are offset by half a division in the circumferential direction with respect to the stator fingers 86 of the further stator part 52.

Consequently, the stator 42 in the second further embodiment has three rings of stator fingers 86 and the rotor 44 in the second further embodiment has three rings of rotor fingers 84.

FIGS. 3, 4, 5 and 6 show further embodiments of the large volume reactor 10 according to the invention, embodied as a kneader or mixer, where only the differences are discussed. In all the exemplary embodiments the same reference numerals are used for corresponding elements.

FIG. 3 shows a single shaft large volume reactor 10 according to the invention according to a second exemplary embodiment. A single shaft large volume reactor is known for example from EP-A-1 417 998 or EP-A-0 274 668.

The large volume reactor 10 shown in FIG. 3 has the premixing unit 30 arranged at the front on the housing 12. The reactor chamber inlet opening 22 is provided in the upper area of the front end wall 18 which is remote from the product outlet 24 from the reactor chamber 14. The premixing unit 30 is arranged on the housing 12 such that the alignment of the shaft 56 of the premixing unit 30 is parallel to the alignment of the axis of rotation D of the reactor rotor 78 and the unit outlet opening 36 is located at the reactor chamber inlet opening 22 and at least approximately congruently.

The large volume reactor 10 according to a third exemplary embodiment of the invention shown in FIG. 4 comprises two reactor rotors 78, 78' aligned parallel to one another and horizontally in the reactor chamber 14. Such large volume reactors are known, for example, from the prior European patent application number EP 05008591 and from EP-A-1 101 525. The direction of rotation and the peripheral speed of each reactor rotor 78, 78' can be selected almost freely, in particular the direction of rotation of one reactor rotor 78 can be the same or opposite to the direction of rotation of the other reactor rotor 78'. The housing 12 in turn has a cylindrical casing 16 but the base area of this cylinder approximately has the outline of a horizontal figure-of-eight. The housing 12 is in turn closed by an end wall on both ends.

The reactor chamber inlet opening 22 is located in an upper area of the casing 16, directly above the axis of rotation D of one reactor rotor 78. The premixing unit 30 is arranged on the housing 12 such that the alignment of the shaft 56 of the premixing unit 30 is vertical and the unit outlet opening 36 is located at the reactor chamber inlet opening 22 and at least approximately congruently.

FIG. 5 shows a double shaft large volume reactor 10 according to a fourth exemplary embodiment of the invention. Compared to the third exemplary embodiment (see FIG. 4), this has the reactor chamber inlet opening 22 in a lateral area of the casing 16 at the height of the axes of rotation D, D'. The premixing unit 30 is arranged on the housing 12 such that the alignment of the shaft 56 of the premixing unit 30 is horizontal and the unit outlet opening 36 is located at the reactor-chamber inlet opening 22 and at least approximately congruently.

FIG. 6 shows a double shaft large volume reactor 10 according to a fifth exemplary embodiment of the invention. This is constructed largely the same as the third exemplary embodiment (see FIG. 4) and likewise has the reactor chamber inlet opening 22 in an upper area of the casing 16. However, the reactor chamber inlet opening 22 is arranged centrally between the two axes of rotation D, D' of the reactor rotors 78, 78'. The premixing unit 30 is arranged on the housing 12 such that the alignment of the shaft 56 of the premixing unit 30 is vertical and the unit outlet opening 36 is located at the reactor-chamber inlet opening 22 and at least approximately congruently.

In a further embodiment, the premixing unit 30 is arranged laterally as in FIG. 5 but above or below the axes of rotation D, D' of the reactor rotors 78, 78'. The alignment of the shaft 56 of the premixing unit 30 can be horizontal or at least approximately in radial alignment with respect to the nearer axis of rotation D.

It is described hereinafter how two starting materials are fed to the large volume reactor according to the first to fifth exemplary embodiments (see FIGS. 1 to 6).

The starting material is fed into the antechamber 48 of the premixing unit 30 through the product inlet connection 64 provided with the product inlet opening 66. As a result of continuous feeding through the product inlet connection 64, the starting material is fed to the radial mixer 39 and pressed therethrough. A further starting material is likewise fed continuously to the premixing unit 30 through the material inlet pipe 70 comprising the further product inlet opening 68, where a larger amount of the starting material in terms of volume or in terms of quantity is preferably fed to the large volume reactor 10 through the product inlet connection 64 than the further starting material fed through the material inlet pipe 70. As a result of the rotor 44 cooperating with the stator 42, the starting material is immediately intimately premixed with the further starting material to form a prepared substance and is conveyed at the same time in the principal conveying direction H through the radial mixer 39. The conveyance of the starting material, the further starting material or the prepared substance is in this case assisted by the centrifugal force acting thereon. The prepared substance is then immediately conveyed through the unit outlet opening 36 and the at least approximately congruently arranged reactor-chamber inlet opening 22 from the premixing unit 30 into the reactor chamber 14 for further processing.

For example, the starting material contains a monomer in which the further starting material, a catalyst, is ideally mixed in the premixing unit 30 by means of the radial mixer 39 or is finely and uniformly dispersed, thus forming the prepared substance. The mixing starts a usually vigorous reaction in which the monomer rapidly reacts to form a polymer. A gel-like or solid phase is formed for example. The prepared substance is immediately supplied to the reactor chamber 14, without needing to pass through a constriction.

The short residence time of the prepared substance in the premixing unit 30 prevents the prepared substance from blocking the premixing unit 30. The reaction heat to be removed or supplied in the above reaction can be effectively removed or supplied through the housing 12.

A high-speed rotor 44 furthermore has a favorable influence on any shaping of the prepared substance. If a solid substance is formed in the reaction of the starting materials, this acquires a granular form thanks to the high-speed rotating rotor 44. This granular form can be further modified by a rotor provided with cutters.

The granular form is substantially retained in the further reaction of the prepared substance in the reactor chamber 14. Any formation of large agglomerates is prevented thanks to the production of the granular form.

Alternatively, instead of a single product inlet connection 64, a plurality of product inlet connections can be provided and/or instead of one material inlet pipe, a plurality of material inlet pipes can be provided at the premixing unit 30.

FIGS. 7 and 8 show a thin layer evaporator 10' according to the invention. Thin layer evaporators are known, for example from EP-A-1 417 998 and DD-A-226 778.

The present thin layer evaporator 10' has the same premixing unit 30 as the large volume reactor 10 according to the first exemplary embodiment.

The housing 12 defining a reactor chamber 14 is formed from a circular cylindrical casing 16 whose cylinder axis Z is vertically aligned. The housing 12 is closed at the top by an end wall 18. Toward the bottom, the reactor chamber 10' is defined by a further end wall (not shown) which has a central product outlet (not shown). The casing 16 has an outlet 26 for vapors at the side and close to the upper end wall 18. Below the outlet 26 for vapors and diametrically opposite thereto, the casing 16 has a reactor chamber inlet opening 22. At said reactor chamber inlet opening 22 the premixing unit 30 is arranged on the housing such that the alignment of the shaft 56 of the premixing unit 30 is at right angles to the cylinder axis Z and the unit outlet opening 36 is arranged at the reactor chamber inlet opening 22 and at least approximately congruently.

A reactor rotor 78 rotating about the cylinder axis Z is arranged in the reactor chamber 14, its reactor rotor shaft 90 being driven by means of a reactor rotor drive 76 located above the housing 12. The reactor rotor 78 has a product distributing ring 92 provided with a concave surface. This product distributing ring 92 embraces the reactor rotor shaft 90, is arranged in the direction of the cylinder axis Z at the height of the reactor chamber inlet opening 22 and is used to uniformly distribute the prepared substance supplied to the reactor chamber 14 through the reactor chamber inlet opening 22 in the circumferential direction. The reactor rotor 78 has four vanes 94 directly underneath the product distributing ring 92 which are embodied as rectangular and flat. The shorter rectangular sides project radially from the rotor 78 and the longer rectangular sides run parallel to the cylinder axis Z. The longer rectangular side radially remote from the cylinder axis Z abuts at least approximately against the inner surface of the casing 16. The vanes 94 are used to distribute the prepared substance on the inner surface of the casing 16.

The thin-layer evaporator 10' operates as follows.

As described in connection with FIGS. 1 and 2, the starting material and the further starting material are mixed in the premixing unit 30 to form a prepared substance. The prepared substance is introduced into the reactor chamber 14 through the unit outlet opening 36 arranged at the reactor-chamber inlet opening 22. The prepared substance is distributed uniformly in the circumferential direction of the casing 16 by the product distributing ring 92 and is transported downward in the flow direction F by gravity. The vapors formed during the processes described above are removed from the reactor chamber 14 through the outlet 26 for vapors. As a result of the rotating reactor rotor 78 and gravity, the prepared substance is conveyed along the inner surface of the casing 16 in the flow direction F to the product outlet 24 (see FIG. 8) and is transferred to the inner surface of the casing 16 again and again by the vanes 94.

In a further embodiment, the thin layer evaporator is not vertically aligned as described above, that is to say with a vertically aligned cylinder axis Z, but is horizontally aligned.

In a further embodiment, the alignment of the thin-layer evaporator can be arbitrary, that is to say the cylinder axis Z is at an arbitrary angle to the vertical.

FIG. 9 shows a premixing unit 30 embodied as an axial premixing unit 38' which can be used instead of the premixing unit 30 embodied as a radial premixing unit 38 described in the above exemplary embodiments.

The premixing unit 30 comprises a unit housing 32 provided with a circular cylindrical unit casing 40 which is closed on one end by a unit housing front wall 34. Opposite to the unit housing front wall 34, the unit housing 32 has a unit outlet opening 36 and radially outside, a flange 110. The inside diameter of the unit outlet opening 36 is the same as the inside diameter of the unit housing 32. Located close to the unit housing front wall 34 is a product inlet connection 64 which passes through the unit casing 40, forming a product inlet opening 66.

Located inside the unit housing 32 is a rotor 44 comprising a shaft 56 and a plurality of radially projecting mixing arms 112 which cooperate with mixing bars 114 arranged on the stator 42 for mixing or agitating. In each case, a plurality, for example three, mixing arms 112 are arranged in a plane at right angles to the shaft 56 and at regular intervals apart in the circumferential direction. A plurality of mixing bars 114, for example three, are likewise arranged in planes at right angles to the shaft 56. A plane with mixing bars 114 is in each case followed in the direction of the shaft 56 by a plane with mixing arms 112. FIG. 9 shows five planes with mixing bars 114 and five planes with mixing arms 112.

The mixing arms 112 and also the mixing bars 114 have different thicknesses in the direction of the shaft 56. The mixing arms 112 and mixing bars 114 are further formed such that a starting material introduced into the premixing unit is conveyed in the principal conveying direction H which runs substantially parallel to the shaft 56 and is directed from the product inlet opening 66 to the unit outlet opening 36. The rotor 44 together with the stator 42 forms the axial mixer 39'.

Approximately centrally between the product inlet opening 66 and the unit outlet opening 36, the premixing unit 30 has a further product inlet opening 68. For this purpose, a material inlet pipe is guided in the radial direction to the shaft 56 through one of the mixing bars 114' and through the adjacent unit casing 40, said pipe having a product inlet connection 64' radially on the outside and the further product inlet opening 68 radially on the inside.

The shaft 56 also has a product inlet channel 116 running in the axial direction to the shaft, its end facing away from the reactor chamber 14 being open. The end of the product inlet channel 116 facing the reactor chamber 14 is closed in the direction of the shaft 56 and a radial product outlet 118 runs in the radial direction from the product inlet channel 116 into an interior chamber of the premixing unit 30, this radial product outlet 118 opening into the interior chamber approximately centrally between the product inlet opening 66 and the unit outlet opening 36 and serving as a central product inlet opening 68'.

The rotor 44 preferably rotates at very high speed compared with the reactor rotor 78, for example at about 5000 revolutions per minute.

The operating mode of the premixing unit 30 embodied as an axial premixing unit 38' is described hereinafter.

The starting material is fed into the axial premixing unit 38' through the product inlet connection 64 provided with the product inlet opening 66 close to the front wall 34 of the unit housing into the interior chamber of the premixing unit 30. The starting material is transported further in the principal conveying direction H by continuous feeding and by rotation of the shaft 56 with the mixing arms 112 arranged thereon.

The starting material fed through the product inlet opening 66 is preagitated between the product inlet connection 64 provided with the product inlet opening 66 and the further product inlet connection 64' provided with the further product inlet opening 68 or the radial product outlet 118. By supplying a further starting material or a plurality of starting materials through the further product inlet opening 68 and/or through the radial product outlet 118, the starting materials supplied to the premixing unit 30 through the product inlet opening 66, the further product inlet opening 68 and the radial product outlet 118 are mixed together. The prepared substance thus produced is delivered from the premixing unit 30 through the unit outlet opening 36 and is fed directly through the reactor chamber inlet opening 22 to the reactor chamber 14 (see FIGS. 1 to 8).

In a further embodiment of a premixing unit embodied as an axial premixing unit, the number of product inlet openings 66 or of further product inlet openings 68 can be different from the exemplary embodiment shown in FIG. 9. The central product inlet opening 68' can naturally also be omitted.

In a further embodiment of the radial premixing unit 38, the product inlet channel 116 with the radial product outlet 118 of the axial premixing unit 38' disclosed in FIG. 9 can also be integrated in the shaft 56 of the radial premixing unit 38.

It is also possible to use a static mixer as a premixing unit. A first starting material is supplied to the static mixer via a product inlet opening, and this is mixed inside a mixing zone with at least one further starting material supplied via at least one further product inlet opening to form a prepared substance. Directly following the mixing zone, this is fed through a unit outlet opening directly to the reactor chamber 14 of the large volume reactor 10 (see FIGS. 1 to 6) or the thin film evaporator 10' (see FIGS. 7 and 8). Naturally, different starting materials can also be supplied to the premixing unit through the same product inlet opening.

Another advantage of the large volume reactor according to the invention or the thin film evaporator according to the invention is that these can be started up directly in continuous mode, that is to say it is not necessary to run through batch mode when starting up before going over to continuous mode as can be necessary in conventional large volume reactors.

Further areas of application of the large volume reactor according to the invention or the thin film evaporator according to the invention lie in the field of compounding polymer melts and degassing processes where nonvolatile additives are added under process conditions. Another area of application is feasibly in the food industry.

That which is claimed:

1. A large volume reactor comprising:
   a housing enclosing a reactor chamber;
   a reactor rotor disposed in the reactor chamber;
   a reactor chamber inlet opening leading into the reactor chamber;
   a product outlet leading away from the reactor chamber; and
   a premixing unit comprising a stator and a rotor mounted on a drive shaft and cooperating with the stator for mixing a starting material supplied via a product inlet opening and having a unit outlet opening which is located adjacent and in communication with the reactor chamber inlet opening;
   wherein the premixing unit is a radial premixing unit conveying the starting material radially outward with respect to the axis of rotation of the rotor during the mixing of the starting material;
   wherein the rotor is cup-shaped and includes a rotor base which faces the reactor chamber and is mounted on the drive shaft, and an annular rotor casing which is fixedly connected to the rotor base and is arranged concentrically to the shaft;

wherein the stator comprises an annular stator part arranged concentrically to the annular rotor casing, and wherein the annular rotor casing and the annular stator part each comprise radial openings; and wherein the annular stator part lies radially inward in relation to the annular rotor casing and is mounted on a stator flange which extends radially outward from the annular stator part and which covers the rotor.

2. The large volume reactor as claimed in claim 1, wherein the reactor rotor is a kneader or a mixer.

3. The large volume reactor as claimed in claim 1, wherein the housing has an inlet connection adjacent the reactor chamber inlet opening and the premixing unit is placed on the inlet connection or inserted in the inlet connection.

4. The large volume reactor as claimed in claim 1,
wherein the stator comprises a further annular stator part arranged concentrically to the first mentioned annular stator part, with the further annular stator part having a larger diameter than the first mentioned annular stator part, and wherein the annular rotor casing is positioned between the first mentioned annular stator part and the further annular stator part, and wherein the rotor comprises a further rotor casing arranged concentrically to the rotor casing, with the further rotor casing having a larger diameter than the rotor casing, and wherein the further stator part is positioned between the rotor casing and the further rotor casing.

5. The large volume reactor as claimed in claim 1, wherein the stator flange defines, inside the premixing unit, an antechamber located on the side of the stator flange facing away from the reactor chamber, and the premixing unit comprises a product inlet opening positioned to discharge into the antechamber.

6. The large volume reactor as claimed in claim 5, wherein the premixing unit comprises a material inlet pipe which passes through the antechamber and has a discharge opening positioned radially inside the annular rotor casing and the annular stator part and defines a further product inlet opening.

7. The large volume reactor as claimed in claim 1, wherein the drive shaft includes a product inlet channel running in the axial direction and which communicates with a radial product outlet which defines a further product inlet opening.

8. A thin film evaporator comprising:
a thin film evaporator housing enclosing a reactor chamber;
a reactor rotor disposed in the reactor chamber of the thin film evaporator;
a reactor chamber inlet opening leading into the reactor chamber of the thin film evaporator;
a product outlet leading away from the reactor chamber of the thin film evaporator; and
a premixing unit comprising a stator and a rotor mounted on a drive shaft and cooperating with the stator for mixing a starting material supplied via a product inlet opening and having a unit outlet opening which is located adjacent and in communication with the reactor chamber inlet opening;
wherein the premixing unit is a radial premixing unit conveying the starter material radially outward with respect to the axis of rotation of the rotor during the mixing of the starting material;
wherein the rotor is cup-shaped and includes a rotor base which faces the reactor chamber and is mounted on the drive shaft, and an annular rotor casing which is fixedly connected to the rotor base and is arranged concentrically to the shaft;
wherein the stator comprises an annular stator part arranged concentrically to the annular rotor casing, and wherein the annular rotor casing and the annular stator part each comprise radial openings; and
wherein the annular stator part lies radially inward in relation to the annular rotor casing and is mounted on a stator flange which extends radially outward from the annular stator part and which covers the rotor.

* * * * *